C. STURTZ.
SHELLING DEVICE.
APPLICATION FILED APR. 11, 1917.
1,236,995.
Patented Aug. 14, 1917.
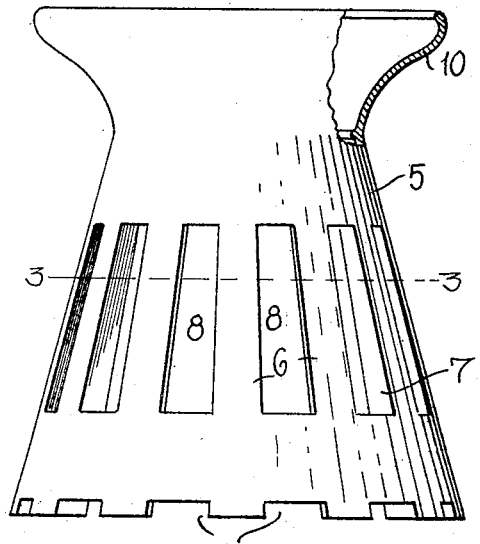
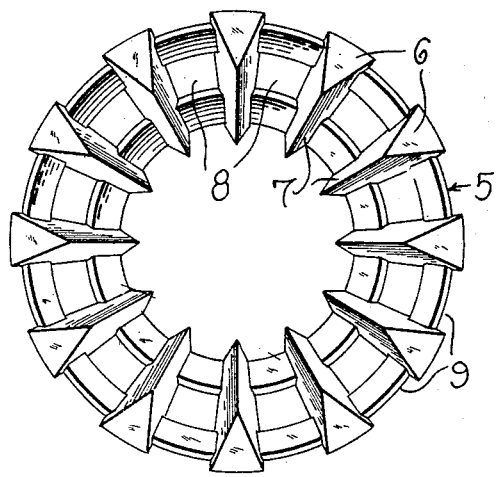
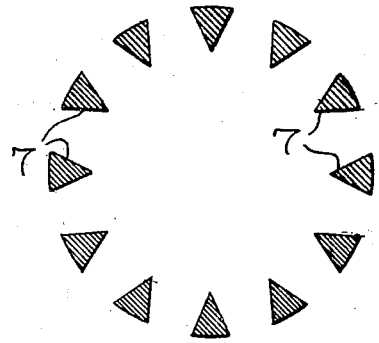
Inventor
CECIL STURTZ
By Watson E. Coleman
Attorney

UNITED STATES PATENT OFFICE.

CECIL STURTZ, OF NEAR DYSART, IOWA.

SHELLING DEVICE.

1,236,995. Specification of Letters Patent. Patented Aug. 14, 1917.

Application filed April 11, 1917. Serial No. 161,349.

*To all whom it may concern:*

Be it known that I, CECIL STURTZ, a citizen of the United States, residing near Dysart, in the county of Benton and State of Iowa, have invented certain new and useful Improvements in Shelling Devices, of which the following is a specification, reference being had to the accompanying drawings.

This invention relates to an improved shelling device and has for its primary object to provide a simple, easily operated, and efficient article whereby the end kernels may be readily shelled from corn ears for planting as seed.

It is a more particular object of the invention to provide a device for the above purpose, which is in the form of a single metal casting having a tapering, hollow body provided with convergently disposed ribs on its inner face and elongated openings between the ribs through which the shelled corn may freely pass, said body having a suitable hand grip formed upon its smaller end.

It is a further general object of the invention to provide a corn shelling device which is convenient and serviceable in practical use and may be manufactured at relatively small cost.

With the above and other objects in view, my invention consists in the novel features of construction, combination and arrangement of parts to be hereinafter more fully described, claimed and illustrated in the accompanying drawing, in which, Figure 1 is a side elevation of my improved corn sheller;

Fig. 2 is an end elevation; and

Fig. 3 is a section taken on the line 3—3 of Fig. 1.

Referring in detail to the drawing, 5 designates the body of the corn sheller which is of hollow, tapering, cylindrical form, the wall thereof being of requisite thickness. Upon the inner face of the body wall, spaced ribs 6 are integrally formed, said ribs being of V-shaped form in cross-section and converging toward the smaller end of the body 5. The beveled side faces 7 of these ribs direct the corn kernels toward and through the longitudinally extending slots or openings 8 in the body wall, which are located between the ribs 6. The ribs 6, at their larger ends, extend beyond the end edge of the body wall, thereby providing notches or recesses 9 in line with the slots 8. The ribs 6 are of a width somewhat less than the width of the slots 8 so that the shelled corn may freely pass through these slots and all danger of clogging of the corn between the ribs will thus be obviated.

Upon the smaller end of the body 5, an annular, outwardly flaring flange 10 is integrally formed, which constitutes a hand grip. This hand grip is so shaped that it may be easily and tightly grasped in the operation of the device.

In the use of the article, the end of the corn ear is inserted into the larger open end of the body 5 with the left hand, and the hand grip 10 tightly grasped with the right hand. The body of the corn sheller is then turned or rotated alternately in opposite directions, while the corn ear is held stationary, and the apices of the several spaced ribs 6 shell the corn kernels from the cob. The notched edge of the body 5 also operates to detach the corn kernels from the cob and the notches permit of the outward movement of the detached kernels from between the adjacent ribs. The majority of the shelled corn, however, is directed by the inclined side faces 7 on the ribs outwardly through the elongated slots 8. It will thus be seen that by means of my device, the corn kernels can be easily and quickly shelled from the end of the ear. The article being constructed in the form of a single metal casting may manifestly be manufactured at small cost. I have also found the device highly efficient and serviceable in practical use. The corn sheller can, of course, be made in various sizes as desired, and while preferably formed of steel, it may also be made of iron or other metal.

While I have herein shown and described the preferred form and construction of the several features of the device, it is to be understood that the same are susceptible of considerable modification and I, therefore, reserve the privilege of adopting all such legitimate changes as may be fairly embodied within the spirit and scope of the invention as claimed.

Having thus fully described my invention, what I desire to claim and secure by Letters Patent is:

1. A corn shelling device consisting of a hollow, tapering, metal body having spaced ribs on its inner face converging toward the smaller end of said body, the opposite ends of the ribs projecting beyond the body wall at its larger end.

2. A corn shelling device consisting of a hollow, tapering, metal body having equidistantly spaced ribs formed upon its inner surface and converging toward the smaller end of the body, said ribs being of triangular form in cross-section and their larger ends projecting beyond the corresponding end of the body, whereby spaced notches are formed between the projecting ends of the ribs, the body wall being also provided with elongated openings therein between the adjacent ribs, and a hand grasp integrally formed with the body at the smaller end thereof.

In testimony whereof I hereunto affix my signature in the presence of two witnesses.

CECIL STURTZ.

Witnesses:
 J. C. MARSAN,
 O. F. MOELLER.

Copies of this patent may be obtained for five cents each, by addressing the "Commissioner of Patents, Washington, D. C."